United States Patent
Bae et al.

(10) Patent No.: US 9,268,084 B2
(45) Date of Patent: Feb. 23, 2016

(54) BACKLIGHT ASSEMBLY AND DISPLAY APPARATUS HAVING THE SAME

(75) Inventors: Hyun-Chul Bae, Gyeonggi-do (KR); Dong-Hyeon Lee, Seoul (KR); Seong-Sik Choi, Seoul (KR); Si-Joon Song, Gyeonggi-do (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 233 days.

(21) Appl. No.: 13/409,980

(22) Filed: Mar. 1, 2012

(65) Prior Publication Data

US 2013/0044508 A1    Feb. 21, 2013

(30) Foreign Application Priority Data

Aug. 16, 2011  (KR) .................. 10-2011-0081020

(51) Int. Cl.
*F21V 8/00* (2006.01)
*G02F 1/1335* (2006.01)
*G02B 6/00* (2006.01)

(52) U.S. Cl.
CPC ........ *G02B 6/0085* (2013.01); *G02F 1/133615* (2013.01); *G02B 6/002* (2013.01); *G02B 6/009* (2013.01); *G02B 6/0068* (2013.01); *G02B 6/0083* (2013.01); *G02F 2001/133628* (2013.01)

(58) Field of Classification Search
CPC .......... F21V 7/05; G02B 6/00; G02B 6/0001; G02B 6/0011; G02B 6/0066; G02B 6/0068; G02B 6/0073; G02B 6/0078; G02B 6/0081; G02B 6/0085
USPC ......................................... 362/631, 600–629
See application file for complete search history.

(56) References Cited

U.S. PATENT DOCUMENTS

| | | |
|---|---|---|
| 2008/0316767 A1 | 12/2008 | Woo et al. |
| 2009/0116262 A1 | 5/2009 | Park |
| 2011/0007236 A1* | 1/2011 | Kim .................... G02F 1/13454 349/58 |
| 2011/0025942 A1 | 2/2011 | Lee |
| 2011/0157512 A1* | 6/2011 | Mishima .............. G02B 6/0068 349/58 |
| 2012/0014135 A1* | 1/2012 | Kim .................. G02F 1/133615 362/623 |
| 2012/0057367 A1* | 3/2012 | Park .................. G02F 1/133603 362/606 |
| 2013/0063680 A1* | 3/2013 | Zhou ...................... G09F 13/04 349/62 |

FOREIGN PATENT DOCUMENTS

| | | |
|---|---|---|
| CN | 1479848 | 3/2004 |
| CN | 2627536 | 7/2004 |
| CN | 101493201 | 7/2009 |
| JP | 2008-053236 | 3/2008 |
| JP | 2010-177076 | 8/2010 |

OTHER PUBLICATIONS

A. Kearnet and E.L. Rooy, Aluminum Foundry Products, Properties and Selection: Nonferrous alloys and Special-Purpose Materials, vol. 2, ASM Handbook, ASM International, 1990 p. 123-151, http://products.asminternational.org/hbk/index.jsp.*

(Continued)

*Primary Examiner* — Anh Mai
*Assistant Examiner* — Nathaniel Lee
(74) *Attorney, Agent, or Firm* — F. Chau & Associates, LLC (57) ABSTRACT

A backlight assembly includes a light emitting part, a light guide plate and a lower receiving container. The light guide plate includes a side surface and a light exiting surface. The lower receiving container includes a heat sinking part and a rigid part having a strength greater than the heat sinking part.

17 Claims, 5 Drawing Sheets

(56) References Cited

OTHER PUBLICATIONS

Electro Galvanized Iron Wire for Wire Mesh, retrieved from http://www.china-steelwire.com/products-145902-0-item-218969.html on Feb. 3, 2014.*

English Abstract for Publication No. 2008-053236.
Office Action dated Sep. 22, 2015 from the Chinese Patent Office in the corresponding Chinese Patent Application No. 201210128509.5 (in Chinese).

* cited by examiner

BACKLIGHT ASSEMBLY AND DISPLAY APPARATUS HAVING THE SAME

CROSS-REFERENCE TO RELATED APPLICATION

This application claims priority under 35 U.S.C. §119 to Korean Patent Application No. 2011-81020, filed on Aug. 16, 2011 in the Korean Intellectual Property Office (KIPO), the contents of which are herein incorporated by reference in their entireties.

BACKGROUND

1. Technical Field

Exemplary embodiments of the present disclosure relate to a backlight assembly and a display apparatus having the backlight assembly. More particularly, embodiments of the present disclosure relate to a backlight assembly having a light source and a display apparatus having the backlight assembly.

2. Description of Related Art

A light emitting diode (LED) may be employed as a light source of a display apparatus such as a liquid crystal display apparatus, an electrophoretic display apparatus, a micro electro mechanical system (MEMS) display apparatus, etc.

In application, the LED generates heat, and the heat generated by the LED may cause damage to components of the display apparatus.

As the number of the LEDs increases in the display apparatus, uniformity of the light generated by the LED increases. Increasing the number of LEDs in the display apparatus may increase the cost for manufacturing the display apparatus.

In an application using LEDs having increased light intensity, the number of the LEDs may be decreased so as to reduce the cost for manufacturing the display apparatus. In such an application, a distance between the LEDs may be increased, and a uniformity of the light generated by the LEDs at a side surface of the light guide plate may be decreased, decreasing a quality of an image displayed by the display apparatus.

SUMMARY

According to an exemplary embodiment of the present disclosure, a backlight assembly includes a light emitting part, a light guide plate and a lower receiving container. The light guide plate includes a side surface and a light exiting. The lower receiving container receives the light emitting part and the light guide plate, and includes a heat sinking part and a rigid part having a strength greater than the heat sinking part.

In one embodiment, the light emitting part is coupled to a vertical portion of the heat sinking part may be disposed over a bottom portion of the heat sinking part.

In one embodiment, the heat sinking part may be combined with the rigid part to extend from the rigid part.

In one embodiment, the heat sinking part may include an aluminum material and the rigid part may include a zinc material.

In one embodiment, a side surface of the light guide plate may include a corner surface inclined with respect to adjacent portion of the side surface and disposed at a corner of the light guide plate.

In one embodiment, the light emitting part may face the corner surface.

In one embodiment, adjacent portions of the side surface of the light guide plate may include a relatively shorter side surface and a relatively longer side surface, and the light emitting part may face the relatively shorter side surface.

In one embodiment, the light emitting part may extend from an area facing the corner surface to an area facing the relatively shorter side surface.

In one embodiment, the heat sinking part may include a bottom surface making contact with the rigid part, and the heat sinking part may further include a sidewall extending vertically from the bottom surface, and the sidewall may include a corner sidewall inclined with respect to adjacent portions of the sidewall and disposed at a corner of the heat sinking part.

In one embodiment, the light emitting part may include a printed circuit board, and a light emitting chip mounted on the printed circuit board.

In one embodiment, the printed circuit board may be bendable.

In one embodiment, the printed circuit board may be a metal core printed circuit board.

In one embodiment, the backlight assembly may further include a reflection sheet disposed between the light guide plate and the lower receiving container, and the heat sinking part may include a first protrusion part supporting the reflection sheet.

In one embodiment, an area of the reflection sheet making contact with the heat sinking part through the first protrusion part may be smaller than an area of the reflection sheet in which the heat sinking part does not make contact with the reflection sheet.

In one embodiment, the backlight assembly may further include a reflection sheet disposed between the light guide plate and the lower receiving container, and the lower receiving container may further include a sub heat sinking part disposed on the heat sinking part and making contact with the reflection sheet to support the reflection sheet.

In one embodiment, the heat sinking part may be disposed on the rigid part.

In one embodiment, the heat sinking part may include a bottom surface combined with the rigid part to extend from the rigid part, and a sidewall extending vertically from the bottom surface and facing the side surface of the light guide plate.

In one embodiment, the light emitting part may be coupled to the sidewall of the heat sinking part to face the side surface of the light guide plate.

According to another exemplary embodiment of the present disclosure, a display apparatus includes a backlight assembly and a display panel. The backlight assembly includes a light emitting part, a light guide plate including a side surface and a light exiting surface, and a lower receiving container receiving the light emitting part and the light guide plate and including a heat sinking part and a rigid part having a strength greater than the heat sinking part. The display panel may display an image using light exiting from the light exiting surface.

In one embodiment, the heat sinking part may be disposed under the light emitting part.

According to an embodiment of the present disclosure, a backlight assembly includes a light guide plate comprising a side surface and a light exiting surface, a light emitting part disposed at the side surface of the light guide plate, a lower receiving container receiving the light emitting part and the light guide plate, and comprising a first part and a second part, wherein the light emitting part is coupled to the first part, and a combining member combining the first part and the second part to form the lower receiving container.

In one embodiment, the backlight assembly further includes a reflection sheet disposed between the light guide plate and the lower receiving container and an insulator disposed between the reflection sheet and lower receiving container.

BRIEF DESCRIPTION OF THE DRAWINGS

Details of the present disclosure will become more apparent by describing in detailed exemplary embodiments thereof with reference to the accompanying drawings, in which.

DETAILED DESCRIPTION OF EXEMPLARY EMBODIMENTS

Hereinafter, exemplary embodiments of the present disclosure will be explained in detail with reference to the accompanying drawings.

Figure 1:
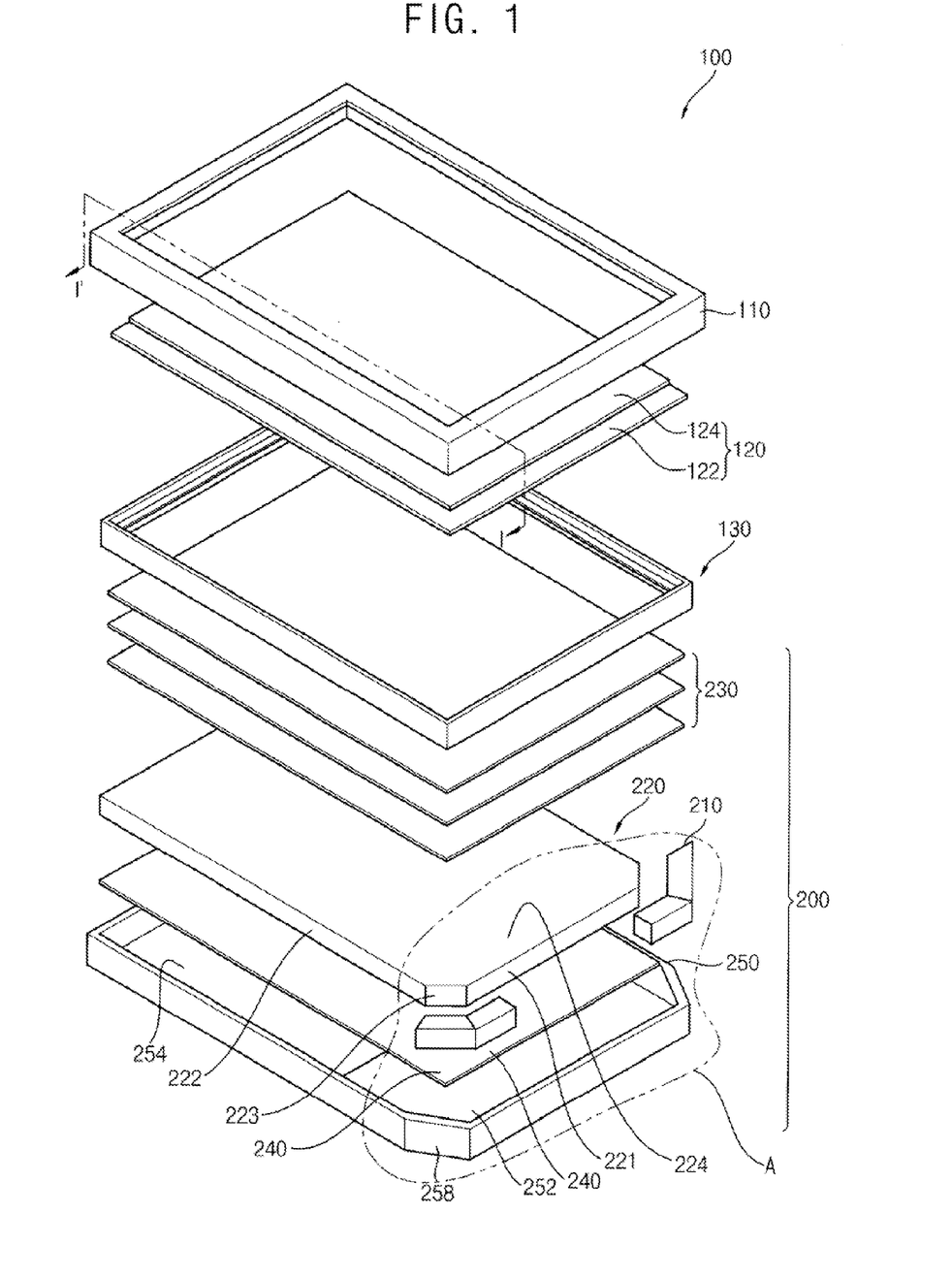
FIG. 1 is an exploded perspective view illustrating a display apparatus according to an exemplary embodiment of the present disclosure.
Figure 2:
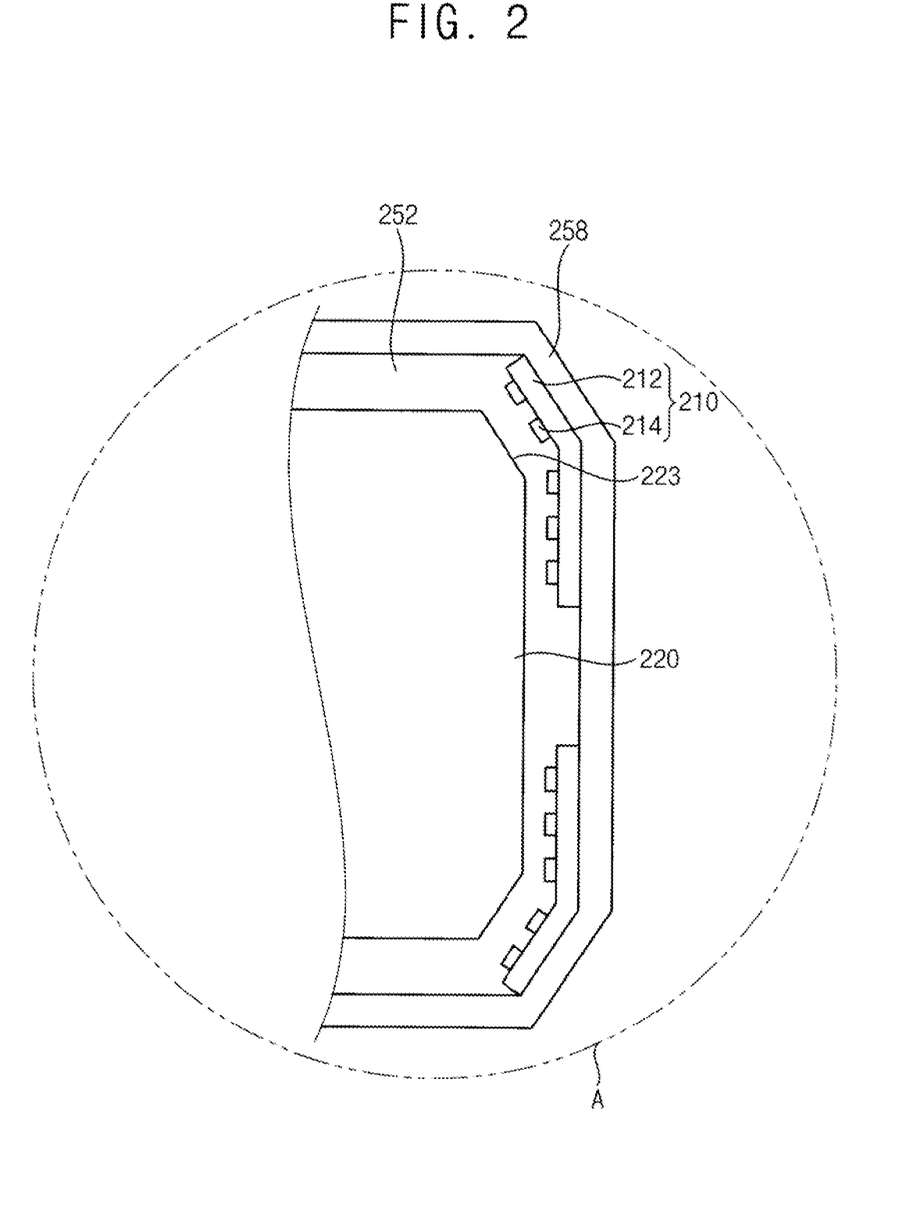
FIG. 2 is a plan view illustrating a portion 'A' of FIG. 1.
Figure 3:
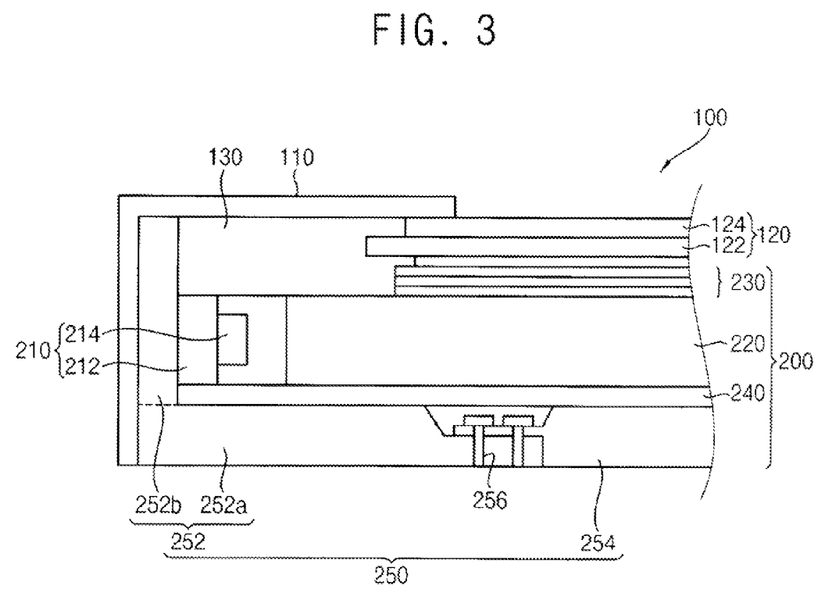
FIG. 3 is a cross-sectional view taken along a line I-I' of FIG. 1.

FIG. 1 is an exploded perspective view illustrating a display apparatus according to an exemplary embodiment of the present disclosure, FIG. 2 is a plan view illustrating a portion 'A' of FIG. 1, and FIG. 3 is a cross-sectional view taken along a line I-I' of FIG. 1.

Referring to FIGS. 1 to 3, the display apparatus 100 includes an upper receiving container 110, a display panel 120 and a backlight assembly 200.

The upper receiving container 110 may be disposed over the display panel 120 and may protect the display panel 120 from an external impact. An opening may be formed through the upper receiving container 110 to expose a display area of the display panel 120.

The display panel 120 includes a thin-film transistor substrate 122, a color filter substrate 124, and a liquid crystal layer (not shown). The thin-film transistor substrate 122 includes a first base substrate, a thin-film transistor, and a pixel electrode. The color filter substrate 124 faces the thin-film transistor substrate 122 and includes a second base substrate, a color filter, and a common electrode. The liquid crystal layer is interposed between the thin-film transistor substrate 122 and the color filter substrate 124, and an alignment of a liquid crystal of the liquid crystal layer may be controlled by an electric field generated between the pixel electrode of the thin-film transistor substrate 122 and the common electrode of the color filter substrate 124. The display panel 120 may display an image using light exiting from a light exiting surface of a light guide plate 220 of the backlight assembly 200.

The backlight assembly 200 may be disposed under the display panel 120 to provide the light to the display panel 120.

The backlight assembly 200 includes a light emitting part 210, the light guide plate 220, optical sheets 230, a reflection sheet 240, and a lower receiving container 250.

The light emitting part 210 includes a printed circuit board (PCB) 212 and a light emitting chip 214 (see FIG. 2). Signal lines for supplying a power to the light emitting chip 214 may be formed on the PCB 212. The light emitting chip 214 may be mounted on the PCB 212 and may receive the power from the PCB 212 to generate the light. For example, the light emitting chip 214 may be a light emitting diode (LED), and the PCB 212 may be a metal core PCB (MCPCB) for transferring heat generated by the light emitting chip 214 away from the light emitting chip 214.

The light guide plate 220 may be disposed at a side of the light emitting part 210, and includes a side surface into which the light is incident and a light exiting surface 224 through which the light incident into the side surface exits. The side surface of the light guide plate 220 may include a relatively shorter side surface 221, a relatively longer side surface 222, and a corner surface 223. The relatively shorter side surface 221 corresponds to a direction substantially parallel with a relatively shorter side of the display panel 120, the relatively longer side surface 222 corresponds to a direction substantially parallel with a relatively longer side of the display panel 120, and the corner surface 223 may be inclined with respect to the relatively shorter side surface 221 and the relatively longer side surface 222 and disposed at a corner between the relatively shorter side surface 221 and the relatively longer side surface 222 of the light guide plate 220.

The light emitting part 210 may face at least one side surface of the light guide plate 220. For example, the light emitting part 210 may face the relatively shorter side surface 221 of the light guide plate 220, and the light emitting part 210 may face the corner surface 223 of the light guide plate 220. Alternatively, the PCB 212 on which the light emitting chip 214 may be mounted may be bendable, and thus the light emitting part 210 may extend from an area facing the corner surface 223 to an area facing the relatively shorter side surface 221, and the light emitting part 210 may extend from the area facing the corner surface 223 to an area facing the relatively longer side surface 222.

The optical sheets 230 may be disposed over the light guide plate 220. The optical sheets 230 may enhance an efficiency of the light exiting from the light guide plate 220. The optical sheets 230 may include a diffusion sheet, a prism sheet, and a light-condensing sheet.

The reflection sheet 240 may be disposed between the light guide plate 220 and the lower receiving container 250, and between the light emitting part 210 and the lower receiving container 250. The reflection sheet 240 may reflect light leaking from the light emitting part 210 and from the light guide plate 220.

The lower receiving container 250 may be combined with the upper receiving container 110 to receive the reflection sheet 240, the light guide plate 220, the light emitting part 210, the optical sheets 230, and the display panel 120.

The lower receiving container 250 includes a heat sinking part 252 and a rigid part 254. An end of the heat sinking part 252 and an end of the rigid part 254 may be combined with each other through a combining member 256, and for example, the combining member 256 may be a screw or a bolt. When the PCB 212 of the light emitting part 210 is the MCPCB, a rear surface of the PCB includes a material such as aluminum having relatively higher heat conductivity compared with other metal materials. In addition, the heat sinking part 252 may include an aluminum material. The light emitting part 210 may be coupled to the heat sinking part 252 through a combining member such as a screw or a bolt, and thus the light emitting part 210 may be coupled to the lower receiving container 250 including the heat sinking part 252 and the rigid part 254.

The heat sinking part 252 may be disposed under the light emitting part 210 and dissipates heat generated by the light emitting part 210 away from the light emitting part 210.

The heat sinking part 252 includes a bottom surface 252a and a sidewall 252b extending vertically from the bottom surface 252a. The sidewall 252b includes a corner sidewall 258. The corner sidewall 258 may be inclined with respect to both sidewalls adjacent to the corner sidewall 258, and may be disposed at a corner of the heat sinking part 252 and faces the corner surface 223 of the light guide plate 220. The PCB 212 facing the corner surface 223 of the light guide plate 220 may be disposed at the corner sidewall 258 of the lower receiving container 250. For example, a front surface of the PCB 212 faces the corner surface 223 of the light guide plate 220, and the rear surface of the PCB 212 faces the corner sidewall 258 of the lower receiving container 250.

The rigid part 254 may have an area wider than an area of the heat sinking part 252, and the rigid part 254 may be stronger than the heat sinking part 252. For example, the rigid part 254 may be a galvanized steel sheet including zinc material. Thus, the rigid part 254 enhances a strength of the lower receiving container 250.

The display apparatus 100 may further include a mold frame 130. The mold frame 130 may be disposed between the display panel 120 and the optical sheets 230 to support the display panel 120. The mold frame 130 fixes the light guide plate 220, the optical sheets 230 and the reflection sheet 240 to the lower receiving container 250.

According to the present exemplary embodiment, the lower receiving container 250 includes the heat sinking part 252 having an aluminum material, and may dissipate heat generated by the light emitting part 210 to an outside of the display apparatus 100. In addition, the lower receiving container 250 includes the rigid part 254 having the area wider than the area of the heat sinking part 252 and a strength greater than the heat sinking part 252. The rigid part 254 enhances the strength of the lower receiving container 250.

Figure 4:
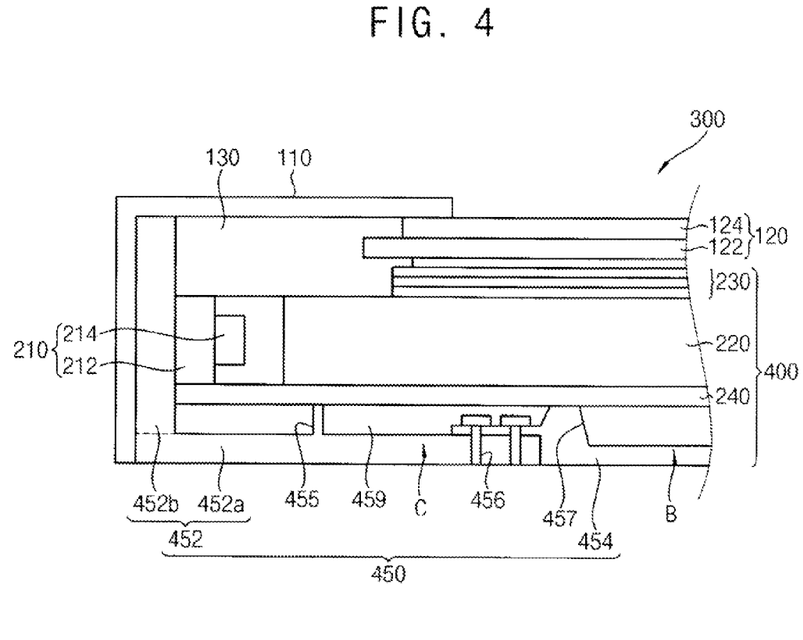
FIG. 4 is a cross-sectional view illustrating a display apparatus according to an exemplary embodiment of the present disclosure.

FIG. 4 is a cross-sectional view illustrating a display apparatus according to an exemplary embodiment of the present disclosure.

The display apparatus 300 according to the present exemplary embodiment is substantially the same as the display apparatus 100 according to the exemplary embodiment illustrated in FIG. 3 except for a lower receiving container 450 of a backlight assembly 400. Thus, the same reference numerals will be used to refer to same or like parts as those described in with reference to FIG. 3 and any further repetitive explanation concerning the above elements will be omitted.

Referring to FIG. 4, the display apparatus 300 according to the present exemplary embodiment includes the upper receiving container 110, the display panel 120, and the backlight assembly 400.

The backlight assembly 400 includes the light emitting part 210, the light guide plate 220, the optical sheets 230, the reflection sheet 240, and the lower receiving container 450.

The lower receiving container 450 includes a heat sinking part 452 and a rigid part 454. An end of the heat sinking part 452 and an end of the rigid part 454 may be combined with each other through a combining member 456. For example, the combining member 456 may be a screw or a bolt. When the PCB 212 of the light emitting part 210 is MCPCB, a rear surface of the PCB includes an aluminum material having high heat conductivity as compared with other metal materials. In addition, the heat sinking part 452 may include an aluminum material. The light emitting part 210 may be coupled to the heat sinking part 452 through a combining member such as a screw or a bolt, and thus, the light emitting part 210 may be coupled with the lower receiving container 450 including the heat sinking part 452 and the rigid part 454. The rigid part 454 may include a portion having a thinner thickness than the heat sinking part 452. For example, a thickness of the rigid part 454 at portion 'B' away from the combining member may be about 0.8 mm, and a thickness of the heat sinking part 452 at portion 'C' away from the combining member may be about 2 mm.

The heat sinking part 452 may be disposed under the light emitting part 210 and dissipates heat generated by the light emitting part 210 away from the light emitting part 210.

The heat sinking part 452 may include a bottom surface 452a making contact with the rigid part 454 and a sidewall 452b extending vertically from the bottom surface 452a.

The bottom surface 452a of the heat sinking part 452 may include a first protrusion part 455 supporting the reflection sheet 240. The heat sinking part 452 makes contact with the reflection sheet 240 through the first protrusion part 455, and an area of the reflection sheet 240 making contact with the heat sinking part 452 through the first protrusion part 455 may be smaller than an area of the reflection sheet 240 in which the heat sinking part 452 does not make contact with the reflection sheet 240. A space 459 may be formed between the heat sinking part 452 and the reflection sheet 240, the space 459 being maintained by the first protrusion part 455. The space 459 between the heat sinking part 452 and the reflection sheet 240 may be an insulator, such as air, and thus heat from the heat sinking part 452 may be substantially prevented from being transferred to the reflection sheet 240, the light guide plate 220, and the display panel 120. The PCB 212 may be disposed at the sidewall 452b.

The rigid part 454 may have an area wider than an area of the heat sinking part 452, and the rigid part 454 may have a strength greater than the heat sinking part 452. For example, the rigid part 454 may be a galvanized steel sheet including zinc material. Thus, the rigid part 454 may enhance the strength of the lower receiving container 450. In addition, the rigid part 454 may include a second protrusion part 457. The second protrusion part 457 makes contact with the reflection sheet 240 to support the reflection sheet 240.

The first protrusion part 455 of the heat sinking part 452 and the second protrusion part 457 of the rigid part 454 support the reflection sheet 240, wherein a contact area between the first protrusion part 455 and the reflection sheet 240 may be smaller than a contact area between the second protrusion part 457 and the reflection sheet 240. The first protrusion part 455 and the second protrusion part 457 substantially prevent the heat from the heat sinking part 452 from being transferred to the reflection sheet 240.

According to the present exemplary embodiment, the area of the reflection sheet 240 making contact with the heat sinking part 452 may be smaller than the area of the reflection sheet 240 in which the heat sinking part 452 does not make contact with the reflection sheet 240, and thus the heat from the heat sinking part 452 may be substantially prevented from being transferred to the reflection sheet 240, the light guide plate 220, and the display panel 120. Thus, damage of the reflection sheet 240, the light guide plate 220, and the display panel 120 due to heat generated by the heat sinking part 452 may be substantially prevented.

Figure 5:
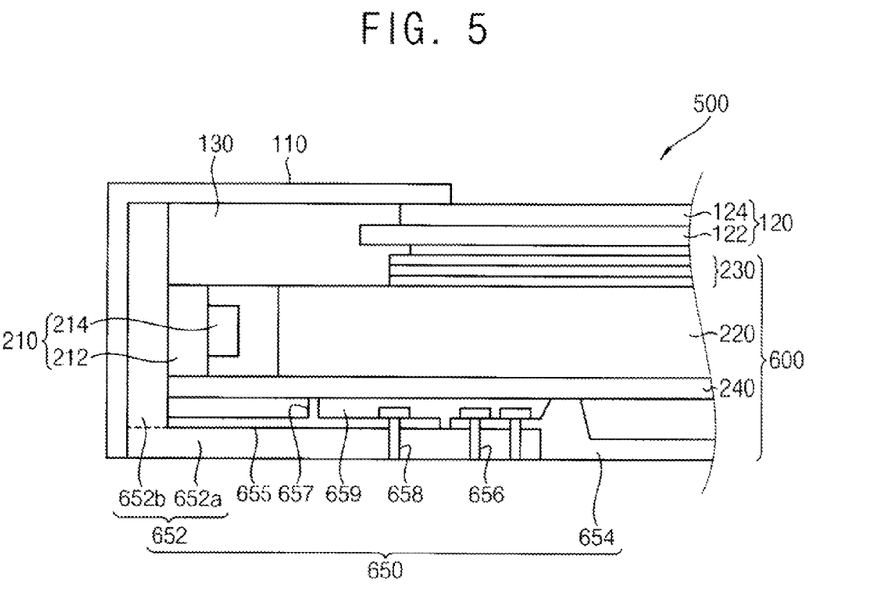
FIG. 5 is a cross-sectional view illustrating a display apparatus according to an exemplary embodiment of the present disclosure.

FIG. 5 is a cross-sectional view illustrating a display apparatus according to an exemplary embodiment of the present disclosure.

The display apparatus 500 according to the present exemplary embodiment is substantially the same as the display apparatus 100 according to the exemplary embodiment illustrated in FIG. 3 except for a lower receiving container 650 of a backlight assembly 600. Thus, the same reference numerals will be used to refer to same or like parts as those described with reference to FIG. 3, and any further repetitive explanation concerning the above elements will be omitted.

Referring to FIG. 5, the display apparatus 500 according to the present exemplary embodiment includes the upper receiving container 110, the display panel 120, and the backlight assembly 600.

The backlight assembly 600 includes the light emitting part 210, the light guide plate 220, the optical sheets 230, the reflection sheet 240, and the lower receiving container 650.

The lower receiving container 650 includes a heat sinking part 652, a rigid part 654, and a sub heat sinking part 655. An end of the heat sinking part 652 and an end of the rigid part 654 are combined with each other through a first combining member 656. For example, the first combining member 656 may be a screw or a bolt. When the PCB 212 of the light emitting part 210 is the MCPCB, a rear surface of the PCB may include an aluminum material having relatively higher heat conductivity compared with other metal materials. In addition, the heat sinking part 652 may include an aluminum material. The light emitting part 210 may be coupled to the heat sinking part 652 through a combining member such as a screw or a bolt, and thus, the light emitting part 210 may be combined to the lower receiving container 650 including the heat sinking part 652 and the rigid part 654.

The heat sinking part 652 may be disposed under the light emitting part 210 and dissipates heat generated by the light emitting part 210 away from the light emitting part 210.

The heat sink part 652 includes a bottom surface 652a making contact with the rigid part 654, and a sidewall 652b extending vertically from the bottom surface 652a. The sub heat sinking part 655 may be disposed on the bottom surface 652a, and the PCB 212 of the light emitting part 210 may be disposed at the sidewall 452b.

The sub heat sinking part 655 may be disposed on the bottom surface 652a of the heat sinking part 652, and the sub heat sinking part 655 may be combined with the heat sinking part 652 through a second combining member 658. For example, the second combining member 658 may be a screw or a bolt. The sub heat sinking part 655 may include an aluminum material. The sub heat sinking part 655 may include a third protrusion part 657 supporting the reflection sheet 240. The sub heat sinking part 655 makes contact with the reflection sheet 240 through the third protrusion part 657, and an area of the reflection sheet 240 making contact with the sub heat sinking part 655 through the third protrusion part 657 may be smaller than an area of the reflection sheet 240 in which the sub heat sinking part 655 does not make contact with the reflection sheet 240. A space 659 may be formed between the sub heat sinking part 655 and the reflection sheet 240 and maintained by the third protrusion part 657. The space 659 between the sub heat sinking part 655 and the reflection sheet 240 may act as an insulator, and thus heat from the heat sinking part 652 and the sub heat sinking part 655 may be substantially prevented from being transferred to the reflection sheet 240, the light guide plate 220, and the display panel 120.

According to the present exemplary embodiment, the sub heat sinking part 655 may be disposed on the heat sinking part 652, and thus heat generated by the light emitting part 210 may be efficiently dissipated away from the light emitting part 210. In addition, the area of the reflection sheet 240 making contact with the sub heat sinking part 655 may be smaller than the area of the reflection sheet 240 in which the sub heat sinking part 655 does not make contact with the reflection sheet 240, and the heat from the sub heat sinking part 655 may be substantially prevented from being transferred to the reflection sheet 240, the light guide plate 220, and the display panel 120. Thus, the reflection sheet 240, the light guide plate 220, and the display panel 120 may be substantially prevented from being damaged due to heat.

Figure 6:
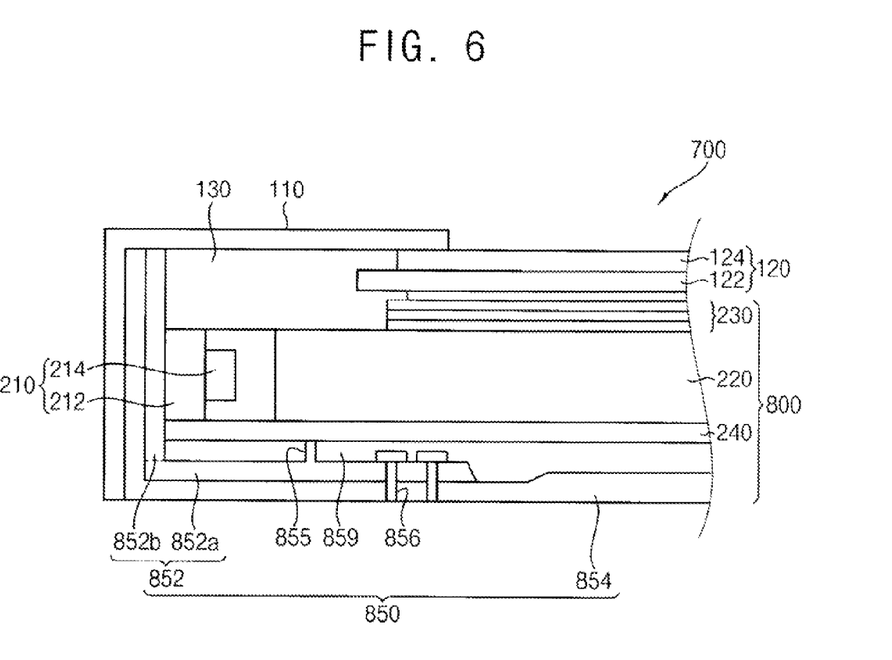
FIG. 6 is a cross-sectional view illustrating a display apparatus according to an exemplary embodiment of the present disclosure.

FIG. 6 is a cross-sectional view illustrating a display apparatus according to an exemplary embodiment of the present disclosure.

The display apparatus 700 according to the present exemplary embodiment is substantially the same as the display apparatus 100 according to the exemplary embodiment illustrated in FIG. 3 except for a lower receiving container 850 of a backlight assembly 800. Thus, the same reference numerals will be used to refer to same or like parts as those described with reference to FIG. 3 and any further repetitive explanation concerning the above elements will be omitted.

Referring to FIG. 6, the display apparatus 700 according to the present exemplary embodiment includes the upper receiving container 110, the display panel 120, and the backlight assembly 800.

The backlight assembly 800 includes the light emitting part 210, the light guide plate 220, the optical sheets 230, the reflection sheet 240, and the lower receiving container 850.

The receiving container 850 includes a heat sinking part 852 and a rigid part 854.

Figure 7:
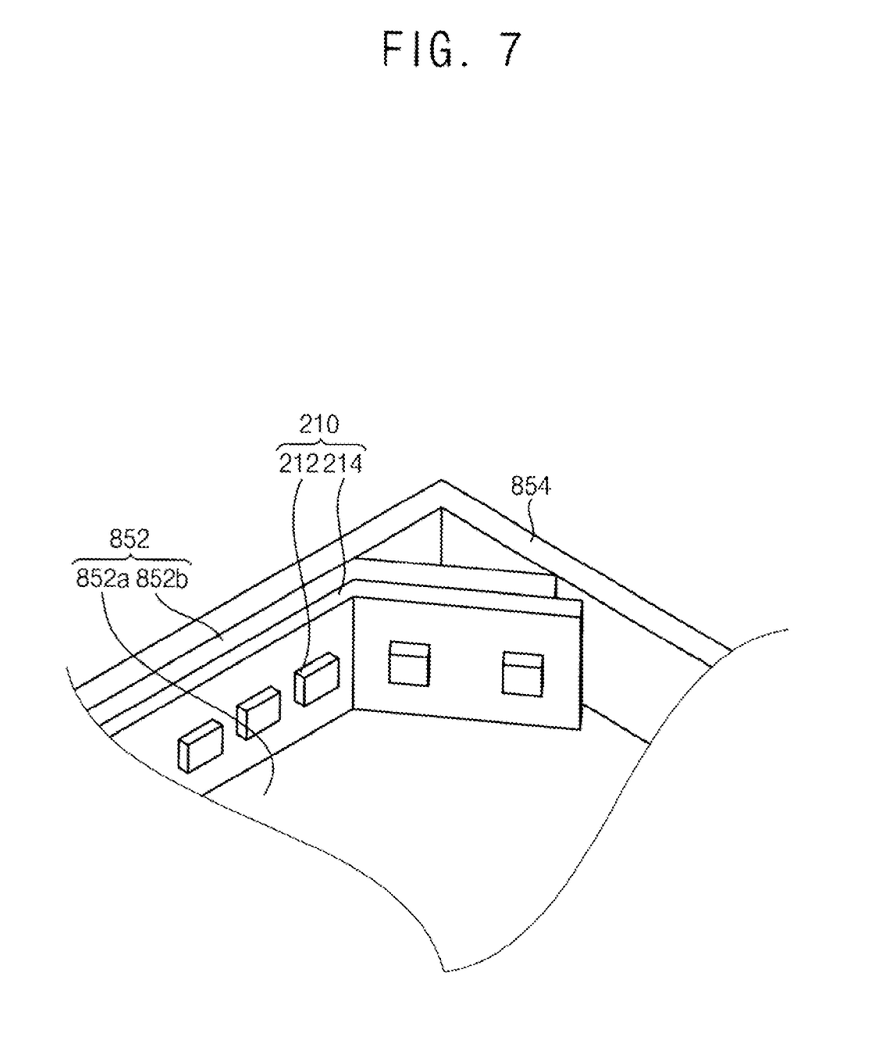
FIG. 7 is a perspective view partially illustrating a light emitting part, a heat sinking part and a rigid part of FIG. 6.

FIG. 7 is a perspective view partially illustrating a light emitting part 210, a heat sink park 852, and a rigid part 854 of FIG. 6.

Referring to FIGS. 6 and 7, the rigid part 854 may occupy an overall area of the lower receiving container 850, and the heat sinking part 852 may be disposed on a portion of the rigid part 854. The heat sinking part 852 and the rigid part 854 may be combined with each other by a combining member 856. For example, the combining member 856 may be a screw or a bolt. When the PCB 212 of the light emitting part 210 is the MCPCB, a rear surface of the PCB includes an aluminum material having relatively higher heat conductivity as compared with other metal materials. In addition, the heat sinking part 852 may include an aluminum material. The light emitting part 210 may be coupled to the heat sinking part 852 through a combining member such as a screw or a bolt, and thus the light emitting part 210 may be combined to the lower receiving container 850 including the heat sinking part 852 and the rigid part 854 combined with each other.

The heat sinking part 852 may be disposed under the light emitting part 210 and dissipates heat generated by the light emitting part 210 away from the light emitting part 210.

The heat sinking part 852 may include a bottom surface 852a and a sidewall 852b extending vertically from the bottom surface 852a and facing the side surface of the light guide plate 220.

The bottom surface 852a of the heat sinking part 852 may include a fourth protrusion part 855 supporting the reflection sheet 240. The heat sinking part 852 makes contact with the reflection sheet 240 through the fourth protrusion part 855. An area of the reflection sheet 240 making contact with the heat sinking part 852 through the fourth protrusion part 855 may be smaller than an area of the reflection sheet 240 in which the heat sinking part 852 does not make contact with the reflection sheet 240. A space 859 may be formed between the heat sinking part 852 and the reflection sheet 240 and maintained by the fourth protrusion part 855. The space 859 may act as an insulator between the heat sinking part 852 and the reflection sheet 240, and thus heat from the heat sinking part 852 may be substantially prevented from being transferred to the reflection sheet 240, the light guide plate 220 and the display panel 120.

The PCB 212 of the light emitting part 210 may be adhered to the sidewall 852b to face the side surface of the light guide plate 210. The PCB 212 may be bendable, and thus the PCB 212 may extend from an area facing the corner surface 223 of the light guide plate 220 to an area facing the relatively shorter side surface 221 of the light guide plate 220 (see FIG. 1). The sidewall 852b of the heat sinking part 852 may be bendable corresponding to the PCB 212.

According to an exemplary embodiment, the rigid part 854 may occupy the entire area of the lower receiving container 850, and thus a strength of the lower receiving container 850 may be increased.

According to an exemplary embodiment of the present disclosure, the backlight assembly and the display apparatus having the backlight assembly, a lower receiving container receiving a light emitting part, a light guide plate, and a display panel of the display apparatus includes a heat sinking part and a rigid part, and heat generated by the light emitting part may be dissipated away from the light emitting part to an outside and a strength of the lower receiving container may be increased. Reliability of the display apparatus may be enhanced by dissipating heat. In addition, an area of a rigid part including zinc material may be wider than an area of a heat sinking part at the lower receiving container, and a cost for manufacturing the display apparatus may be decreased.

In addition, the light emitting part faces a corner surface disposed at a corner of the light guide plate, and light uniformity may be increased and quality of an image displayed by the display apparatus may be enhanced.

The foregoing is illustrative of the present disclosure and is not to be construed as limiting thereof. Although a few exemplary embodiments of the present disclosure have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the appended claims. The present disclosure is defined by the following claims, with equivalents of the claims to be included therein.

What is claimed is:

1. A backlight assembly comprising:
   a light emitting part;
   a light guide plate comprising a. side surface and a light exiting surface; and
   a lower receiving container receiving the light emitting part and the light guide plate,
   wherein the lower receiving container comprises a heat sinking part and a rigid part having a strength greater than the heat sinking part,
   wherein the light emitting part is coupled to a vertical portion of the heat sinking part, wherein a space is interposed between a bottom portion of the heat sinking part and the light guide plate, and
   wherein the rigid part is connected only with an end part of the bottom portion of the heat sinking part.

2. The backlight assembly of claim 1, wherein the heat sinking part includes an aluminum material and the rigid part includes a zinc material.

3. The backlight assembly of claim 1, wherein the side surface of the light guide plate comprises a corner surface inclined with respect to adjacent portions of the side surface and disposed at a corner of the light guide plate.

4. The backlight assembly of claim 3, wherein the light emitting part faces the corner surface.

5. The backlight assembly of claim 3, wherein the adjacent portions of the side surface of the light guide plate include a relatively shorter side surface and a relatively longer side surface, and the light emitting part faces the relatively shorter side surface.

6. The backlight assembly of claim 5, wherein the light emitting part extends from an area facing the corner surface to an area facing the relatively shorter side surface.

7. The backlight assembly of claim 3, wherein the heat sinking part comprises a bottom surface making contact with the rigid part, and wherein the heat sinking part further comprises a sidewall extending vertically from the bottom surface, and the sidewall comprises a corner sidewall inclined with respect to adjacent portions of the sidewall and disposed. at a corner of the heat sinking part.

8. The backlight assembly of claim 1, wherein the light emitting part comprises:
   a printed circuit board; and
   a light emitting chip mounted on the printed circuit board.

9. The backlight assembly of claim 8, wherein the printed circuit board is bendable.

10. The backlight assembly of claim 8, wherein the printed circuit board is a metal core printed circuit board.

11. The backlight assembly of claim 1, further comprising:
    a reflection sheet disposed between the light guide plate and the bottom portion of the heat sinking part,
    wherein the heat sinking part comprises a first protrusion part supporting the reflection sheet,
    wherein the height of the first protrusion part is substantially the same as the height of the space, and
    wherein the reflection sheet is further disposed between the light emitting part and the bottom portion of the heat sinking part.

12. The backlight assembly of claim 11, wherein an area of the reflection sheet making contact with the first protrusion part of the heat sinking part is smaller than an area of the reflection sheet spaced apart from the heat sinking part.

13. The backlight assembly of claim 11, further comprising:
    an insulator disposed between the reflection sheet and lower receiving container.

14. The backlight assembly of claim 1, further comprising:
    a reflection sheet disposed between the light guide plate and the bottom portion of the heat sinking part, wherein the lower receiving container further comprises a sub heat sinking part disposed on the heat sinking part and making contact with the reflection sheet for supporting the reflection sheet,
    wherein the reflection sheet is further disposed between the light emitting part and the bottom portion of the heat sinking part.

15. The backlight assembly of claim 14, wherein the sub heat sinking part comprises a protruding part supporting the reflection sheet.

16. The backlight assembly of claim 1, further comprising:
a combining member configured to connecting the end part of the bottom portion of the heat sinking part and the rigid part.

17. A display apparatus comprising:
a backlight assembly comprising
- a light emitting part;
- a light guide plate comprising a side surface and a light exiting surface; and
- a lower receiving container receiving the light emitting part and the light guide plate,
    - wherein the lower receiving container comprises a heat sinking part and a rigid part having a strength greater than the heat sinking part,
    - wherein the light emitting part is coupled to a vertical portion of the heat sinking part, and
    - wherein a space is interposed between a bottom portion of the heat sinking part and the light guide plate, and
    - wherein the rigid part is connected only with an end part of the bottom portion of the heat sinking part; and a display panel for displaying an image using light exiting from the light exiting surface.

\* \* \* \* \*